(12) United States Patent
Cook et al.

(10) Patent No.: US 6,237,950 B1
(45) Date of Patent: May 29, 2001

(54) STAGED AIR BAG INFLATOR

(75) Inventors: Fred J. Cook, Gilbert; Barry F. Shaffer, Mesa; Darrin L. Johnson, Fountain Hills; Edward F. Randell, Apache Junction, all of AZ (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/360,920

(22) Filed: Jul. 26, 1999

(51) Int. Cl.$^7$ .................................................. B60R 21/26
(52) U.S. Cl. ........................... 280/736; 280/741; 102/531
(58) Field of Search .................... 280/736, 737, 280/740, 741, 742; 102/443, 530, 531

(56) References Cited

U.S. PATENT DOCUMENTS

| | | | |
|---|---|---|---|
| 5,219,178 | * 6/1993 | Kobari et al. | 280/736 |
| 5,480,185 | * 1/1996 | Lowe et al. | 280/740 |
| 5,613,705 | * 3/1997 | Hock et al. | 280/736 |
| 5,643,345 | * 7/1997 | Cox et al. | 280/740 |
| 5,664,802 | * 9/1997 | Harris et al. | 280/740 |
| 5,762,368 | * 6/1998 | Faigle et al. | 280/741 |
| 5,808,232 | * 9/1998 | Siddiqui | 280/71 |
| 5,890,735 | * 4/1999 | Smith | 280/737 |
| 5,967,550 | * 10/1999 | Shirk et al. | 280/736 |
| 6,019,389 | * 2/2000 | Burgi et al. | 280/736 |
| 6,032,979 | * 3/2000 | Mossi et al. | 280/736 |
| 6,068,291 | * 5/2000 | Lebaudy et al. | 280/736 |
| 6,095,556 | * 8/2000 | Bailey et al. | 280/737 |
| 6,095,559 | * 8/2000 | Smith et al. | 280/741 |
| 6,116,641 | * 9/2000 | Scheffee | 280/737 |

OTHER PUBLICATIONS

Co–pending U.S. patent application Ser. No. 09/129,710, filed Aug. 5, 1998 entitled "Air Bag Inflator Including Plural Burst Disks".

Co–pending U.S. patent application Ser. No. 08/946,152, filed Oct. 7, 1997 entitled "Staged Pyrotechnic Air Bag Inflator".

* cited by examiner

Primary Examiner—J. J. Swann
Assistant Examiner—Christopher Bottorff
(74) Attorney, Agent, or Firm—Tarolli, Sundheim, Covell, Tummino & Szabo L.L.P.

(57) ABSTRACT

An apparatus (10) for inflating an inflatable vehicle occupant protection device (32) comprises a container (20) defining a gas storage chamber (14), and inflation fluid (66) under pressure in the gas storage chamber. An opening (40, 42) in the container (20) enables fluid flow from the gas storage chamber (14) to the inflatable device (32). A rupturable burst disk (60, 62) extends across the opening (40, 42). An assembly (80) in the gas storage chamber (14) is provided for producing combustion products for heating and pressurizing the inflation fluid (66). The assembly (80) includes a housing (82) and a separator (100) in the housing defining first and second chambers (112, 114). A first pyrotechnic charge (122) in the first chamber (112) has a first burn rate. The housing (82) has first fluid outlets (96) for enabling flow of combustion products from the first chamber (112) to the gas storage chamber (14). A second pyrotechnic charge (124) in the second chamber (114) has a second burn rate less than the first burn rate. The housing (82) has second fluid outlets (98) for enabling flow of combustion products from the second chamber (114) to the gas storage chamber (14).

15 Claims, 3 Drawing Sheets

STAGED AIR BAG INFLATOR

BACKGROUND OF THE INVENTION

1. Technical Field

The present invention relates to a vehicle safety apparatus and, in particular, to an inflator for an inflatable vehicle occupant protection device, such as an air bag.

2. Description of the Prior Art

It is known to inflate a vehicle occupant protection device, such as an air bag, to help protect a vehicle occupant. The air bag is inflated by inflation fluid from an inflator.

Some air bag inflators include inflation fluid stored under pressure in a chamber in a container. A burst disk blocks flow of inflation fluid from the chamber. An initiator is actuatable to rupture the burst disk and to initiate flow of inflation fluid from the chamber to inflate the air bag. One type of inflator includes a pyrotechnic material which, when ignited, generates combustion products for heating and pressurizing the inflation fluid stored in the chamber.

It is known to tailor the output pressure of an inflator, in order to inflate an air bag in a predetermined manner over a period of time. For example, it is known to begin inflating an air bag at first with inflation fluid at a relatively low pressure, then finish inflating the air bag with inflation fluid at a relatively high pressure. Some known inflators of this type have two independently actuatable pyrotechnic charges for heating and pressurizing inflation fluid stored in a container.

SUMMARY OF THE INVENTION

The present invention is an apparatus for inflating an inflatable vehicle occupant protection device. The apparatus comprises a container defining a gas storage chamber, and inflation fluid under pressure in the gas storage chamber. An opening in the container enables fluid flow from the gas storage chamber to the inflatable device. A rupturable burst disk extends across the opening. An actuator assembly in the gas storage chamber is provided for producing combustion products for heating and pressurizing the inflation fluid. The actuator assembly includes a housing and a separator in the housing defining first and second chambers. A first pyrotechnic charge in the first chamber has a first burn rate. The housing has first fluid outlets for enabling flow of combustion products from the first chamber to the gas storage chamber. A second pyrotechnic charge in the second chamber has a second burn rate less than the first burn rate. The housing has second fluid outlets in the housing for enabling flow of combustion products from the second chamber to the gas storage chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
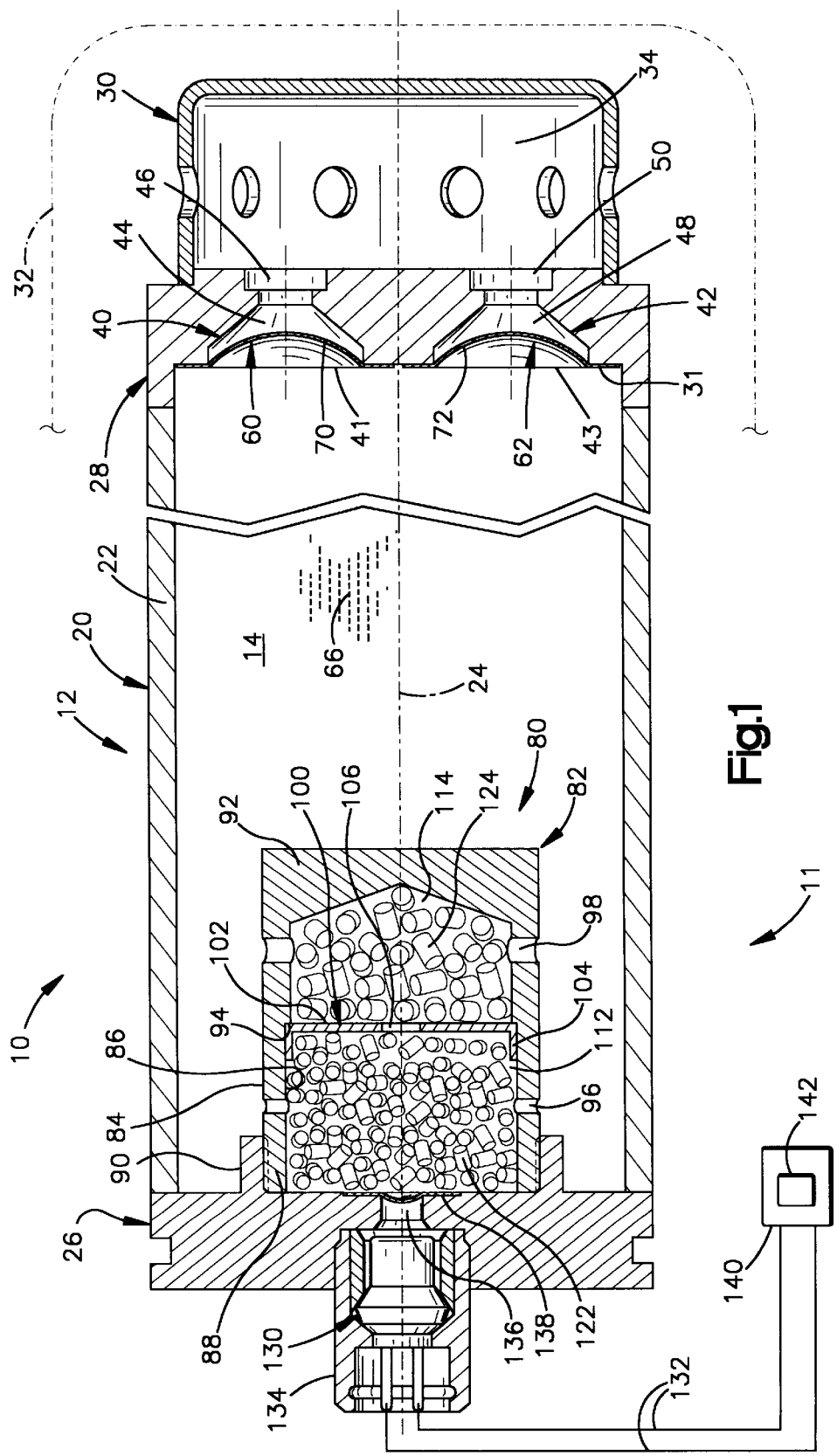
FIG. 1 illustrates a vehicle safety apparatus including an inflator in accordance with the invention.

The present invention relates to a vehicle safety apparatus and, in particular, to an inflator for an inflatable vehicle occupant protection device, such as an air bag. The present invention is applicable to various inflator constructions. As representative of the present invention, FIG. 1 illustrates an inflator 10 which forms a part of a vehicle safety apparatus 11.

The inflator 10 includes a container 12 which defines a gas storage chamber 14. The container 12 has a cylindrical main body portion 20 which includes an axially extending side wall 22 of the container. The side wall 22 of the container 12 is centered on a longitudinal central axis 24 of the inflator 10. First and second end walls 26 and 28 of the container 12 are fixed to the main body portion 20 of the container.

A diffuser 30 is fixed to the second end wall 28 of the container 12. The diffuser 30 is in fluid communication with an inflatable vehicle occupant protection device in the form of an air bag indicated schematically at 32. The diffuser 30 defines a diffuser chamber 34 which is located outside of the container 12. The diffuser chamber 34 is at ambient air pressure.

First and second outlet passages 40 and 42 are formed in the second end wall 28 of the container 12. The first outlet passage 40 terminates in an opening 41 in an inner end surface 31 of the second end wall 28. The second outlet passage 42 terminates in an opening 43 in the end surface 31. The outlet passages 40 and 42 establish fluid communication between the gas storage chamber 14 and the diffuser chamber 34.

The outlet passages 40 and 42 are spaced apart from each other on opposite sides of the axis 24 and are "in parallel" with each other. Specifically, each one of the outlet passages 40 and 42 provides a separate, independent, fluid flow path between the gas storage chamber 14 and the diffuser chamber 34.

The outlet passages 40 and 42 are identical to each other in size and configuration. The first outlet passage 40 has a frustoconical main portion 44 adjacent the opening 41 and a stepped, cylindrical portion 46. The second outlet passage 42 has a frustoconical main portion 48 adjacent the opening 43 and a stepped, cylindrical portion 50. Because the outlet passages 40 and 42 are identical to each other in size and configuration, the effective flow area of the first outlet passage 40 is the same as the effective flow area of the second outlet passage 42. While the passages 40 and 42 are shown as being identical, they may not be identical. For example, cylindrical portion 50 of passage 42 may have a larger diameter than cylindrical portion 46 of passage 40.

A first burst disk 60 is welded to the inner end surface 31 of the second end wall 28. The first burst disk 60 has a domed, circular configuration and extends across the opening 41. The first burst disk 60 blocks fluid flow through the first outlet passage 40.

A second burst disk 62 is welded to the inner end surface 31 of the second end wall 28. The second burst disk 62 has a domed, circular configuration and extends across the opening 43. The second burst disk 62 blocks fluid flow through the second outlet passage 42. The second burst disk 62 is the same size, including diameter, as the first burst disk 60.

A quantity of inflation fluid 66 is stored under pressure in the chamber 14. The inflation fluid 66 preferably comprises an inert gas, such as argon or helium, under pressure. Also, oxygen could be mixed with the inert gas. The inflation fluid 66 is stored at a pressure in the range of about 1,500 psig to about 10,000 psig. The inflation fluid 66 may alternatively comprise a combustible mixture of gases including a primary gas and a fuel gas. The primary gas comprises the majority of the inflation fluid that inflates the air bag 32. The fuel gas, when ignited, heats the primary gas to increase the pressure and temperature of the fluid in the gas storage chamber 14.

The first and second burst disks 60 and 62 have inner side surfaces 70 and 72, respectively, which are exposed to the pressure of the inflation fluid 66 when the first and second burst disks are unruptured. The burst disks 60 and 62 could, alternatively, be formed in one piece with the second end wall 28, as thin-walled sections of the second end wall, for example.

A pressure differential exists across the first burst disk 60 when the inflator 10 is in the unactuated condition shown in FIG. 1, because the inflation fluid 66 in the gas storage chamber 14 is maintained at a pressure greater than the ambient air pressure in the diffuser chamber 34. The first burst disk 60 is rupturable when the pressure differential across the first burst disk exceeds a first predetermined pressure differential. When the inflator 10 is in the unactuated condition shown in FIG. 1, the pressure differential across the first burst disk 60 is less than the first predetermined pressure differential, and the first burst disk does not rupture.

A pressure differential also exists across the second burst disk 62 when the inflator 10 is in the unactuated condition shown in FIG. 1, because the inflation fluid in the gas storage chamber 14 is maintained at a pressure greater than the ambient air pressure in the diffuser chamber 34. The second burst disk 62 is rupturable when the pressure differential across the second burst disk exceeds a second predetermined pressure differential. When the inflator 10 is in the unactuated condition shown in FIG. 1, the pressure differential across the second burst disk 62 is less than the second predetermined pressure differential, and the second burst disk does not rupture.

The first burst disk 60 is designed to rupture at a different pressure than the second burst disk 62. Specifically, the first burst disk 60 is designed to rupture at a lower pressure differential than the second burst disk 62. Because both the first burst disk 60 and the second burst disk 62 are exposed to ambient pressure on one side, from the diffuser chamber 34, the two burst disks rupture at different pressures of inflation fluid 66 in the gas storage chamber 14.

The two burst disks 60 and 62 can be configured in alternative manners to provide the different rupture pressures. For example, the first burst disk 60 could be thinner and therefore weaker than the second burst disk 62. Alternatively, the first burst disk 60 could be scored with score lines and thereby made weaker than the second burst disk 62.

The inflator 10 includes an actuator assembly 80 for producing combustion products for heating and pressurizing the inflation fluid 66. The actuator assembly 80 is located in the gas storage chamber 14 in the container 12.

The actuator assembly 80 includes a propellant housing 82. The propellant housing 82 is a cup-shaped metal member having a generally cylindrical configuration. The propellant housing 82 includes a side wall 84 having a cylindrical inner surface 86. An end portion 88 of the side wall 84 is screwed into a projecting flange 90 on the first end wall 26 of the inflator 10. An end wall 92 at the opposite end of the side wall 84 closes the propellant housing 82.

An annular, radially extending shoulder surface 94 is formed on the inner surface 86 of the side wall 84 of the propellant housing 82. The shoulder surface 94 is presented toward the first end wall 26 of the inflator 10. A circular array of primary nozzles 96 is formed in the side wall 84 of the propellant housing 82. The primary nozzles 96 are located between the shoulder surface 94 and the first end portion 88 of the propellant housing 82.

A circular array of secondary nozzles 98 is formed in the side wall 84 of the propellant housing 82. The secondary nozzles 98 are located between the shoulder surface 94 and the end wall 92 of the propellant housing 82. The total flow area of the secondary nozzles 98, as a group, preferably is larger than the total flow area of the primary nozzles 96.

The actuator assembly 80 includes a separator 100 located in the propellant housing 82. The separator 100 is a metal plate having a radially extending central wall 102 and a cylindrical, axially extending side flange 104. A circular opening 106, centered on the axis 24, is formed in the central wall 102 of the separator 100.

The side flange 104 of the separator 100 is in abutting engagement with the inner surface 86 of the side wall 84 of the propellant housing 82. The radially outermost portion of the central wall 102 of the separator 100 is in engagement with the shoulder surface 94 on the propellant housing 82. The engagement of the separator 100 with the shoulder surface 94 blocks movement of the separator in a direction toward the end wall 92 of the propellant housing 82.

The separator 100 is located between and partially defines primary and secondary propellant chambers 112 and 114 in the propellant housing. The primary nozzles 96 establish fluid communication between the primary propellant chamber 112 and the gas storage chamber 14. The secondary nozzles 98 establish fluid communication between the secondary propellant chamber 114 and the gas storage chamber 14. The opening 106 in the central wall 102 of the separator establishes fluid communication between the primary propellant chamber 112 and the secondary propellant chamber 114.

A primary propellant 122 is disposed in the primary propellant chamber 112. The primary propellant 122 is preferably provided in the form of discs or pellets, illustrated schematically in FIG. 1, of a known pyrotechnic material. A secondary propellant 124 is disposed in the secondary propellant chamber 114. The secondary propellant 124 is preferably provided in the form of discs or pellets made of the same material as the primary propellant 122.

The pellets which form the secondary propellant 124 are larger than the pellets which form the primary propellant 122. As a result, the secondary propellant 124 has a relatively slow rate of generation of combustion products ("burn rate"), and the primary propellant 122 has a relatively fast rate of generation of combustion products ("burn rate").

The inflator includes an initiator 130. The initiator 130 is a known device which is electrically energizable, by an electric signal over lead wires 132, to produce hot combustion products for igniting the primary propellant 122. The initiator 130 is located in an initiator housing 134 secured in the first end wall 26 of the inflator 10. The initiator 130 is connected in fluid communication with the primary propellant chamber 112 by a passage 136 in the first end wall 26 of the inflator 10. A rupturable burst disk 138 closes the passage 136 prior to energization of the initiator 130.

The vehicle safety apparatus 11 includes known means indicated schematically at 140 (FIG. 1) for sensing a collision involving the vehicle and for energizing the initiator 130 in response to the sensing of a collision. The means 140 may include a sensor 142 and vehicle electric circuitry for energizing the initiator 130 in response to sensing a vehicle condition having a severity greater than a predetermined threshold value.

In the event of sensing such a condition, the sensing means 140 provides an electrical signal over the lead wires 132 to the initiator 130 in the inflator 10. The initiator 130 is actuated in a known manner and ruptures the burst disk 138. The combustion products of the initiator 130 ignite the primary propellant 122. The primary propellant 122 burns and produces hot combustion products. The relatively small primary nozzles 96 maintain a high pressure in the primary chamber 112 and help the primary propellant 122 to react with a fast burn rate.

The combustion products of the primary propellant 124 flow through the primary nozzles 96 in the side wall 84 of the propellant housing 82 and into the gas storage chamber 14. The combustion products heat and pressurize the inflation fluid 66 in the gas storage chamber 14. The pressure in the gas storage chamber 14 increases sufficiently that the pressure differential across the first burst disk 60 exceeds the first predetermined pressure differential. The first burst disk 60 ruptures and the inflation fluid 66 flows out of the gas storage chamber 14 into the diffuser chamber 34.

The inflation fluid 66 flows from the diffuser chamber 34 to the air bag 32, to inflate the air bag. The second predetermined pressure differential (for the second burst disk 62) is selected so that the second burst disk does not rupture at the pressure levels reached in the gas storage chamber 14 when only the primary propellant 122 is ignited.

The separator 100 prevents the secondary propellant 124 from being ignited directly by the combustion products of the initiator 130. When the primary propellant 122 burns, however, it produces a jet of hot combustion products, or flame, which travels through the opening 106 in the central wall 104 of the separator 100 into the secondary propellant chamber 114. The combustion products of the primary propellant 122 ignite the secondary propellant 124. Thus, the secondary propellant 124 is ignited only after some burning of the primary propellant 122, thus achieving a desired time delay.

The relatively large secondary nozzles 98 help to reduce the pressure in the secondary chamber 114 and thus help to provide a lower burn rate for the secondary propellant 124. The combustion products of the secondary propellant 124 flow through the secondary nozzles 98 in the side wall 84 of the propellant housing 82 and into the gas storage chamber 14. The combustion products further heat and pressurize the inflation fluid 66 in the gas storage chamber 14.

The pressure in the gas storage chamber 14 increases sufficiently that the pressure differential across the second burst disk 62 exceeds the second predetermined pressure differential, thus rupturing the second burst disk. The inflation fluid 66 flows out of the gas storage chamber 14 into the diffuser chamber 34.

The sequential opening of the burst disks 60 and 62 provides an output curve for the inflator 10 in which pressure rises over time, as may be desired. Several other features and characteristics of the inflator 10 can be varied and controlled to provide a desired output curve for the inflator. These items include the absolute and relative burn rates of the first and second propellants 122 and 124; the absolute and relative sizes of the primary and secondary nozzles 96 and 98; and the rupturing characteristics of the two burst disks 60 and 62.

In addition, the size of the flame jet passing through the separator opening 106 into the secondary propellant chamber 114 affects the burning time of the secondary propellant 124. Therefore, the size and location of the opening 106 from the primary propellant chamber 112 into the secondary propellant chamber 114 can be varied, or a plurality of such openings can be provided.

As noted above, the secondary propellant 124 has a lower burn rate than the primary propellant 122. The different burn rates for the two propellants 122 and 124 can be achieved in a variety of ways. For example, different propellant materials or mixtures of different propellant materials can be used to provide the propellants 122 and 124 with different burn rates. Alternatively, the propellants 122 and 124 can have different fuel-oxidizer ratios, or different consolidation densities (obtained by subjecting the propellant materials to different pressures during formation of the propellants).

Figure 2:
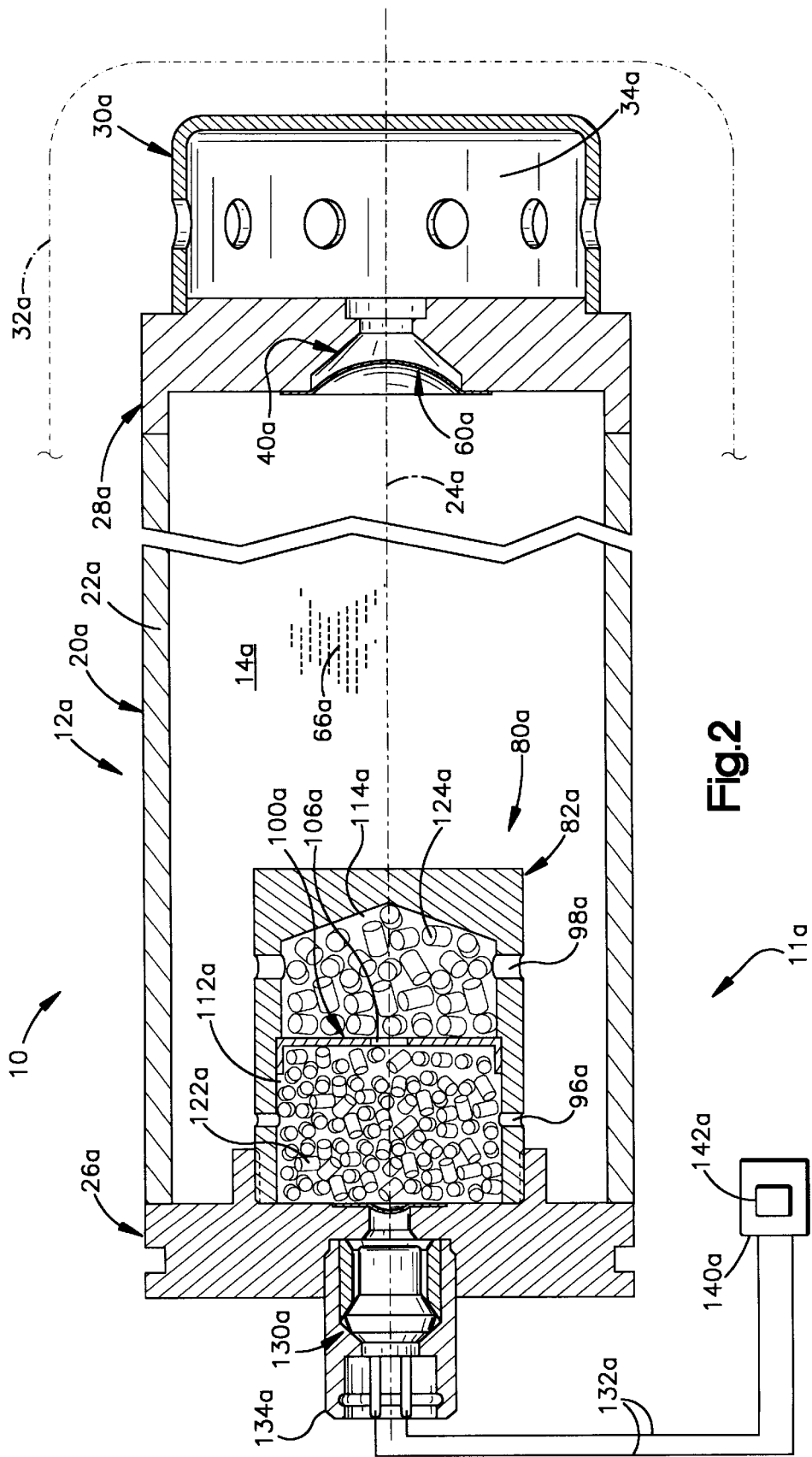
FIG. 2 is a view similar to FIG. 1 of a vehicle safety apparatus including an inflator in accordance with a second embodiment of the invention.

FIG. 2 illustrates a vehicle safety apparatus 11a including an inflator 10a in accordance with a second embodiment of the invention. The inflator 10a is generally similar in construction and operation to the inflator 10 (FIG. 1), and similar parts are identified by similar reference numerals with the suffix "a" added for clarity.

The inflator 10a includes only one burst disk 60a for enabling flow of inflation fluid 66a out of the gas storage chamber 14a into the diffuser 30a. As a result, the output characteristics of the inflator 10a are different from those of the inflator 10. Specifically, the single burst disk 60a is rupturable under the pressure of the inflation fluid 66a when the inflation fluid is heated and pressurized by the combustion products of the primary propellant 122a. Subsequent ignition of the secondary propellant 124a results in increased flow of inflation fluid out of the inflator 10a, rather than rupturing of a second burst disk.

Figure 3:
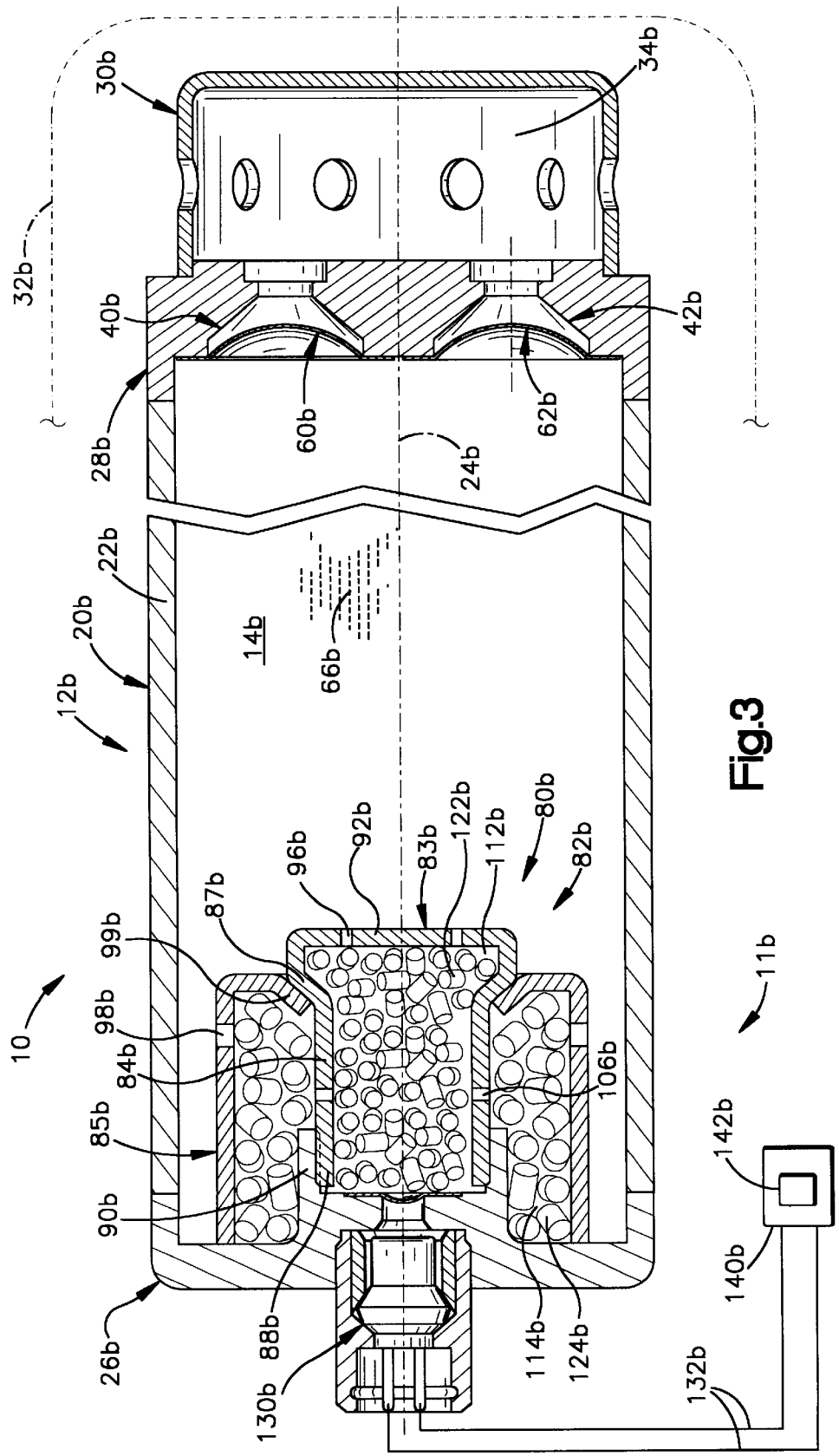
FIG. 3 is a view similar to FIG. 1 of a vehicle safety apparatus including an inflator in accordance with a third embodiment of the invention.

FIG. 3 illustrates an inflator 10b in accordance with a third embodiment of the invention. The inflator 10b is similar in construction and operation to the inflator 10 (FIG. 1), and similar parts are identified by similar reference numerals with the suffix "b" added for clarity.

The inflator 10b includes an actuator assembly 80b having first and second propellants 122b and 124b which are separated radially rather than axially as in the inflator 10. Specifically, the actuator assembly 80b includes a two-piece propellant housing 82b. The propellant housing includes a primary housing 83b and a secondary housing 85b. The primary housing 83b has a cup-shaped configuration including a cylindrical side wall 84b. An end portion 88b of the side wall is screwed into a projecting flange 90b on the first end wall 26b of the inflator 10b.

The side wall 84b of the primary housing 83b has an outwardly flared portion 87b which merges into a radially extending end wall 92b of the primary housing. A plurality of primary nozzles 96b extend through the end wall 92b of the primary housing 83b. A primary propellant chamber 112b is defined inside the primary housing 83b.

The secondary housing 85b extends around the primary housing 83b. The secondary housing 85b has a cylindrical side wall with a plurality of secondary nozzles 98b. The secondary housing 85b has a radially inwardly projecting end wall 99b which is engaged by the flared portion 87b of the primary housing 83b. This engagement holds the secondary housing 85b in position against the first end wall 26b of the inflator 10b. An annular secondary propellant chamber 114b is defined inside the secondary housing 85b, radially outward of the side wall 84b of the primary housing 83b.

The side wall 84b of the primary housing 83b acts as a separator between the primary chamber 112b and the secondary chamber 114b. A plurality of openings 106b in the side wall 84b of the primary housing 83b establish fluid communication between the primary propellant chamber 112b and the secondary propellant chamber 114b.

A primary propellant 122b is disposed in the primary propellant chamber 112b. A secondary propellant 124b is disposed in the secondary propellant chamber 114b. The secondary propellant 124b has a relatively slow burn rate, and the primary propellant 122b has a relatively fast burn rate.

The propellant assembly 80b functions in a manner similar to the propellant assembly 80. Upon actuation of the initiator 130b, combustion products of the initiator ignite the primary propellant 122b. The primary propellant 122b burns and produces hot combustion products which flow into the gas storage chamber 14b. The combustion products heat and pressurize the inflation fluid 66b in the gas storage chamber 14b. The pressure in the gas storage chamber 14b increases sufficiently to rupture the first burst disk 60b.

Combustion products of the primary propellant 122b also travel through the openings 106b into the secondary propellant chamber 114b. The combustion products of the primary propellant 122b ignite the secondary propellant 124b. The combustion products of the secondary propellant 124b flow through the secondary nozzles 98b into the gas storage chamber 14b. The combustion products further heat and pressurize the inflation fluid 66b in the gas storage chamber 14b, and the second burst disk 62b ruptures. Alternatively, the inflator lob could, like the inflator 10a, include only one burst disk rather than two.

From the above description of the invention, those skilled in the art will perceive improvements, changes and modifications in the invention. For example, an inflator could include three or more burst disks which rupture at different pressure differentials across the respective burst disks. Also, an inflator could include a single burst disk structure having burst areas of different thicknesses, for example, and which areas burst at different pressure differentials across the respective areas. Such improvements, changes and modifications within the skill of the art are intended to be covered by the appended claims.

Having described the invention, we claim:

1. An apparatus for inflating an inflatable vehicle occupant protection device, said apparatus comprising:
   a container defining a gas storage chamber;
   inflation fluid under pressure in said gas storage chamber;
   an opening in said container for enabling fluid flow from said gas storage chamber to the inflatable device;
   a rupturable burst disk extending across said opening; and
   an assembly in said gas storage chamber for producing combustion products for heating and pressurizing said inflation fluid, said assembly including:
      a housing defining a combustion chamber;
      a separator within said housing, said separator dividing said combustion chamber into first and second chambers;
      a first pyrotechnic charge disposed within said first chamber and adjacent said separator, said first pyrotechnic charge having a first burn rate;
      first fluid outlets that provide direct fluid communication between said first chamber and said gas storage chamber;
      a second pyrotechnic charge disposed within said second chamber and adjacent said separator, said second pyrotechnic charge having a second burn rate less than the first burn rate; and
      second fluid outlets that provide direct fluid communication between said second chamber and said gas storage chamber.

2. An apparatus as set forth in claim 1 wherein said each one of said first and second pyrotechnic charges comprises a plurality of discrete bodies of pyrotechnic material, the bodies of material forming said first pyrotechnic charge being smaller than the bodies of material forming said second pyrotechnic charge.

3. An apparatus as set forth in claim 1 wherein said first and second pyrotechnic charges are made from different propellant materials or mixtures of different propellant materials.

4. An apparatus as set forth in claim 1 wherein said first and second pyrotechnic charges are made from pyrotechnic materials having different fuel-oxidizer ratios.

5. An apparatus as set forth in claim 1 wherein said first and second pyrotechnic charges are made from pyrotechnic materials having different consolidation densities.

6. An apparatus as set forth in claim 1 comprising a second opening in said container for enabling fluid flow from said gas storage chamber to the inflatable device and a second rupturable burst disk extending across said second opening;
   said inflator having a first actuated condition in which said first pyrotechnic charge is ignited and said first burst disk is ruptured and said second burst disk is unruptured so that inflation fluid flows from the gas storage chamber in a fluid flow path which extends through only said first opening; and
   said apparatus having a second actuated condition in which both said first and second pyrotechnic charges are ignited and the pressure in said gas storage chamber increases to a level at which both said first burst disk and said second burst disk are ruptured so that a first portion of said inflation fluid flows from said gas storage chamber through said first opening and a second portion of said inflation fluid flows from said gas storage chamber through said second opening.

7. An apparatus as set forth in claim 1 wherein said first and second chambers in said housing of said assembly are separated axially by said separator.

8. An apparatus as set forth in claim 1 wherein said first and second chambers in said housing of said assembly are separated radially by said separator.

9. An apparatus as set forth in claim 1 comprising wherein said first fluid outlets have a smaller total flow area than said second fluid outlets.

10. An apparatus as set forth in claim 1 wherein said first pyrotechnic charge is disposed between an initiator and said separator.

11. An apparatus as set forth in claim 1 wherein said separator has a single opening providing fluid communication between said first and second chambers, combustion products of said first pyrotechnic charge flowing through said single opening in said separator to ignite said second pyrotechnic charge after ignition of said first pyrotechnic charge.

12. An apparatus for inflating an inflatable vehicle occupant protection device, said apparatus comprising:
   a container defining a gas storage chamber;
   inflation fluid under pressure in said gas storage chamber;
   a first opening in said container for enabling fluid flow from said gas storage chamber to the inflatable device;
   a first rupturable burst disk extending across said first opening;

a second opening in said container for enabling fluid flow from said gas storage chamber to the inflatable device;

a second rupturable burst disk extending across said second opening, said first opening and said second opening being in fluid communication with said gas storage chamber; and an assembly in said gas storage chamber for producing combustion products for heating and pressurizing said inflation fluid, said assembly including:

a housing defining a combustion chamber;

a separator within said housing, said separator dividing said combustion chamber into first and second chambers;

a first pyrotechnic charge in said first chamber and adjacent said separator, said first pyrotechnic charge having a first burn rate;

first fluid outlets that provide direct fluid communication between said first chamber and said gas storage chamber;

a second pyrotechnic charge in said second chamber and adjacent said separator, said second pyrotechnic charge having a second burn rate less than the first burn rate; and second fluid outlets that provide direct fluid communication between said second chamber and said gas storage chamber.

13. An apparatus as set forth in claim 12 wherein said first opening and said second opening each provide a separate, independent fluid flow path between said gas storage chamber and the inflatable device.

14. An apparatus for inflating an inflatable vehicle occupant protection device, said apparatus comprising:

a container defining a gas storage chamber;

inflation fluid under pressure in said gas storage chamber;

an opening in said container for enabling fluid flow from said gas storage chamber to the inflatable device;

a rupturable burst disk extending across said opening; and an assembly in said gas storage chamber for producing combustion products for heating and pressurizing said inflation fluid, said assembly including:

a housing;

a separator in said housing defining first and second chambers;

a first pyrotechnic charge in said first chamber, said first pyrotechnic charge having a first burn rate;

first fluid outlets in said housing for enabling flow of combustion products from said first chamber to said gas storage chamber;

a second pyrotechnic charge in said second chamber, said second pyrotechnic charge having a second burn rate less than the first burn rate; and second fluid outlets in said housing for enabling flow of combustion products from said second chamber to said gas storage chamber, said first pyrotechnic charge burning simultaneously with said second pyrotechnic charge after ignition of said second pyrotechnic charge by combustion products of said first pyrotechnic charge.

15. An apparatus for inflating an inflatable vehicle occupant protection device, said apparatus comprising:

a container defining a gas storage chamber;

an actuatable initiator;

inflation fluid under pressure in said gas storage chamber;

an opening in said container for enabling fluid flow from said gas storage chamber to the inflatable device;

a rupturable burst disk extending across said opening; and an assembly in said gas storage chamber for producing combustion products for heating and pressurizing said inflation fluid, said assembly including:

a housing;

a separator in said housing defining first and second chambers;

a first pyrotechnic charge in said first chamber, said first pyrotechnic charge having a first burn rate;

first fluid outlets in said housing for enabling flow of combustion products from said first chamber to said gas storage chamber;

a second pyrotechnic charge in said second chamber, said second pyrotechnic charge having a second burn rate less than the first burn rate; and second fluid outlets in said housing for enabling flow of combustion products from said second chamber to said gas storage chamber, said initiator igniting said first pyrotechnic charge, said first pyrotechnic charge, when ignited, igniting said second pyrotechnic charge.

* * * * *